April 1, 1930.    F. J. WHITE    1,752,319
APPARATUS FOR REDUCING SHEATH CURRENTS
Original Filed April 8, 1927
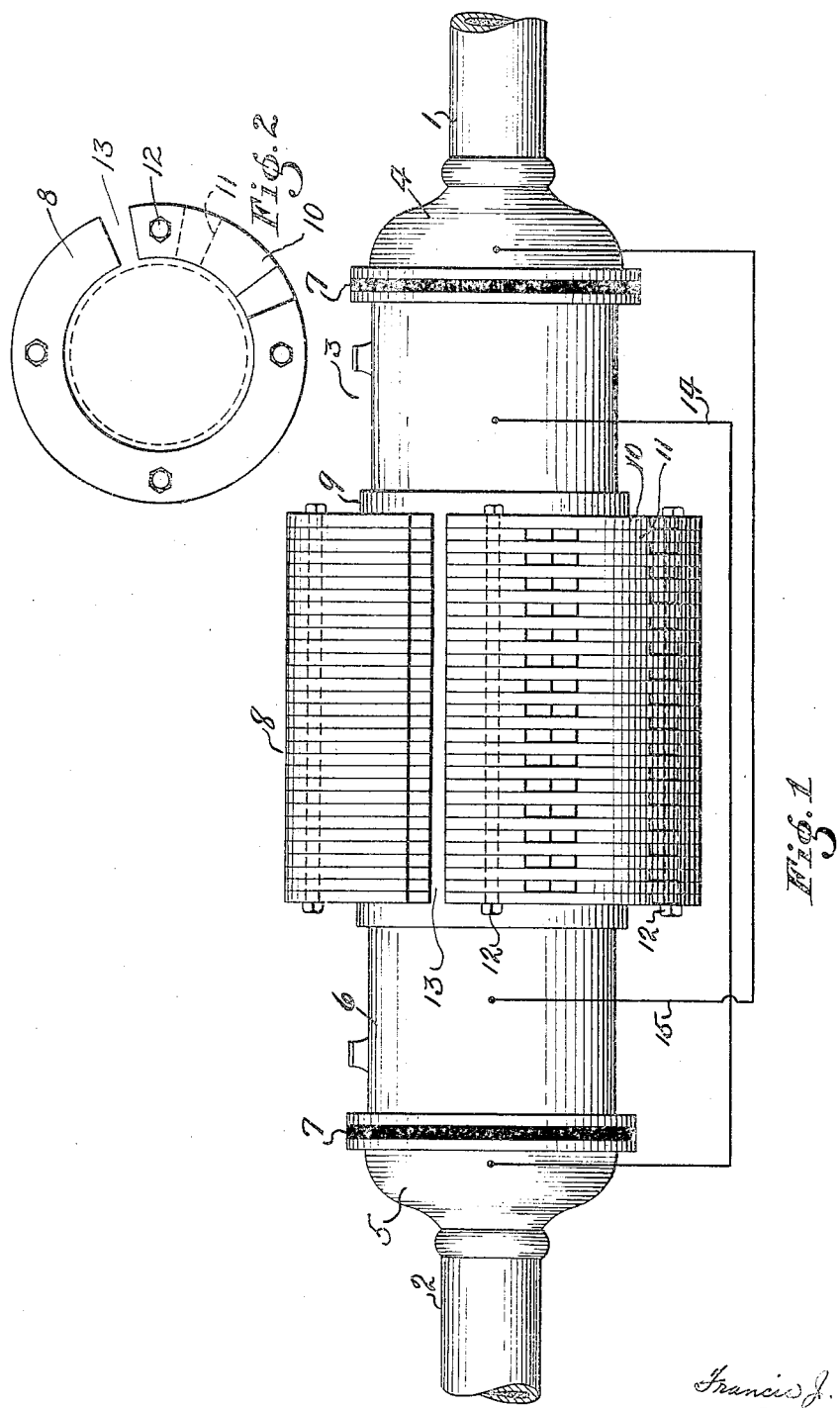

Patented Apr. 1, 1930

1,752,319

UNITED STATES PATENT OFFICE

FRANCIS J. WHITE, OF BROOKLYN, NEW YORK, ASSIGNOR TO THE OKONITE COMPANY, OF PASSAIC, NEW JERSEY, A CORPORATION OF NEW JERSEY

APPARATUS FOR REDUCING SHEATH CURRENTS

Original application filed April 8, 1927, Serial No. 181,916. Divided and this application filed February 28, 1928. Serial No. 257,680.

The present invention relates to an improvement in electric apparatus and particularly to apparatus for use in connection with conductor cables for carrying alternating or pulsating currents, and has for one of its objects the provision of an apparatus for reducing the currents induced in the sheath covering the cable, these currents being referred to hereinafter as sheath currents.

It is well known that the passage of an alternating or pulsating current through a single conductor cable or the unbalancing of alternating currents in a multiple conductor cable induces an electromotive force in the cable sheath or other metallic cover with which the cable may be provided, which if this sheath or other metallic cover is not connected to ground or to other conducting paths may cause a dangerous difference of potential between the metallic cover and adjacent structures. It is a further object of my invention, therefore, to reduce or, if desired, to neutralize this action. On the other hand if the metallic cover is electrically connected with other conducting paths so as to form a complete circuit a current is set up. This so-called sheath current in addition to the losses in transmission it causes has an appreciable effect on the heating of the cable and hence reduces the permissible current in the conductor.

The present invention has special reference to junction or joint boxes through which the adjacent ends of two lengths of conductor cable are joined together, and in which structures the difficulties above referred to are encountered. The present application is a division of my co-pending application No. 181,916, filed April 8, 1927, in which application my invention is claimed with relation to the reduction of sheath currents in a cable without special reference to junction boxes.

The present application will be confined to apparatus for use in connection with joint or junction boxes.

In the drawings, Fig. 1 shows an embodiment of my invention in elevation; and

Fig. 2 is an end view of the magnetizable member of Fig. 1.

Referring to the drawing, 1 and 2 designate the ends of two lengths of a conductor cable either of the single or multiple conductor type and joined or united by a joint or junction box 3. This joint box 3 comprises metallic ends 4 and 5, respectively, electrically connected to the adjacent cable sheaths, and an intermediate metallic section 6, this section, however, being of non-magnetic material. The intermediate section 6 is mechanically attached to but electrically insulated from the metallic ends 4 and 5 by insulations 7.

Around the intermediate portion 6 of the box or in any event in inductive relation to the conductor or conductors of the cable I apply a member 8 of magnetizable material, insulation 9 being interposed between this member and the metal of the section 6 of the box. This member 8, as illustrated, is composed of laminations 10 and 11 arranged in overlapping position and held in adjusted position by bolts 12. The laminated structure is so assembled as to provide an air gap 13, the width of which can be adjusted readily by merely changing the relative positions of laminations 10 and 11, to vary the reluctance of the magnetic circuit of the structure, or the same effect, electrically, can be obtained by entirely removing some of the laminations. The construction of the member 8 as just described may be varied if desired by substituting solid rings for the laminations 10 and 11, it being understood of course that I would still have a built up laminated structure, and that the necessary adjustments could be effected by varying the number of rings or annuli employed.

A conductor 14 has one end thereof connected to the metallic end plate 5 of the junction box to which the cable length 2 is connected or to the sheath of cable length 2 while its other end is connected to the remote end of the intermediate portion 6 of the box. Likewise a conductor 15 has one end connected to the metallic end plate 4 of the joint or junction box or to the sheath of cable length 1. The other end of this conductor is connected to the remote end of the intermediate portion 6 of the box. It will be obvious that as so connected the two conductors 14 and 15 will in conjunction with the intermediate member 6 of the joint box function as a one turn neutralizing coil for the core 8, and that the electromotive force induced in the sheath of the cable length 1 and in the sheath of the cable length 2 is opposed by the electromotive force induced in the material 6 of the junction box.

A similar result could also be attained by having the sections 4, 5 and 6 consolidated into one section, the insulation 7 in such a construction being interposed between the members 4 and 5 and the sheaths of cable lengths 1 and 2, respectively. In such case it is evident that the end of the conductor 14, now connected to the member 5, must be connected to the sheath of cable length 2, while the end of conductor 15, now connected to member 4, must be connected to the sheath of cable length 1.

It will be seen, therefore, that I have provided an apparatus capable of installation at the joint or junction boxes by which two adjacent cable lengths are attached to each other whereby so-called sheath currents are reduced or, if desired, may be completely neutralized, it being understood as above explained that the member 8 may be adjusted as desired thereby eliminating or reducing to a degree where no longer detrimental the setting up of dangerous potentials in the cable covering.

It is to be understood furthermore that while I have illustrated and described reducing or neutralizing means in which an annulus of magnetizable laminated material is employed, my neutralizing or reducing means may take other forms, if desired, provided of course the same is magnetizable by the current or currents flowing in the conductor or conductors of the cable.

It is to be further understood, as above pointed out, that my invention is applicable to joint boxes connecting cable lengths of either the single or multiple conductor type, and that the appended claims are to be so interpreted.

What I claim is:—

1. In combination a junction or joint box for connecting the conductors of two lengths of an electric cable, a section of said junction or joint box being insulated from adjacent sections of the junction or joint box and from the adjacent sheath of said lengths of electric cable, a core of laminated magnetizable material disposed about the insulated portion of said box and in inductive relation to the cable conductor therein, each end of said insulated section being connected by a conductor to the remote cable sheath.

2. In combination a junction or joint box for connecting the conductors of two lengths of an electric cable, a section of said junction or joint box being insulated from adjacent sheaths of said lengths of electric cable, an adjustable core of laminated magnetizable material disposed in inductive relation to the cable conductor within the insulated section of the joint box, each end of said insulated section of the joint box being connected by a conductor to the remote cable sheath.

3. In combination a joint box for connecting the conductors of two lengths of an electric cable, a section of said joint box being insulated from adjacent sections and from adjacent sheaths of said lengths of electric cable, a core adjustable as to the reluctance of its magnetic circuit positioned in inductive relation to the conductor of said lengths of cable within the insulated section of the junction box, and conductors connecting said insulated section of the junction box and the adjacent cable sheaths to provide electrically, in cooperation with the insulated section of the junction box, a coil for the said core.

4. In combination a junction or joint box composed of two sections and an intermediate section insulated from each other, a core of magnetizable material about the intermediate section of the box and conductors connecting the intermediate section of the joint box to the end sections and providing electrically with the intermediate section a coil for the said core.

5. In a junction or joint box the combination of two metallic end sections, an intermediate section of non-magnetizable material insulated therefrom, a magnetizable core disposed about the said intermediate section, said core being provided with an adjustable air gap, and conductors connecting the intermediate section and one end section and the intermediate section and the other end section in opposition, said intermediate section and said conductors cooperating to provide electrically a coil for said core.

6. In combination, a joint box, cable lengths united through said joint box, a member of magnetizable material disposed about the exterior of the box and in inductive relation to the conductors of the cable within the box, sheaths for said cables outside said box and insulated therefrom, a conductor connecting the joint box and one of said sheaths, another conductor connecting the box and another of said sheaths in opposition to the first-mentioned connection to oppose the electromotive force induced in the sheaths of the cable lengths to a point where not detrimental.

This specification signed this 27th day of February, 1928.

FRANCIS J. WHITE.